(12) United States Patent
Varoglu et al.

(10) Patent No.: US 11,586,653 B2
(45) Date of Patent: Feb. 21, 2023

(54) DYNAMIC LOCATION SEARCH SUGGESTIONS BASED ON TRAVEL ITINERARIES

(71) Applicant: Apple Inc., Cupertino, CA (US)

(72) Inventors: Devrim Varoglu, Santa Clara, CA (US); Swapnil R. Dave, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/574,405

(22) Filed: Jan. 12, 2022

(65) Prior Publication Data

US 2022/0222280 A1    Jul. 14, 2022

Related U.S. Application Data

(63) Continuation of application No. 16/866,335, filed on May 4, 2020, now Pat. No. 11,256,731, which is a continuation of application No. 16/371,975, filed on Apr. 1, 2019, now Pat. No. 10,657,160, which is a continuation of application No. 15/925,363, filed on Mar. 19, 2018, now Pat. No. 10,296,526, which is a continuation of application No. 15/293,644, filed on
(Continued)

(51) Int. Cl.
| | |
|---|---|
| *G06F 9/44* | (2018.01) |
| *G06F 16/29* | (2019.01) |
| *G06F 16/9535* | (2019.01) |
| *G06F 16/9537* | (2019.01) |
| *G06F 16/2455* | (2019.01) |
| *G06F 9/54* | (2006.01) |

(52) U.S. Cl.
CPC .............. *G06F 16/29* (2019.01); *G06F 9/543* (2013.01); *G06F 16/24565* (2019.01); *G06F 16/9535* (2019.01); *G06F 16/9537* (2019.01)

(58) Field of Classification Search
CPC ........................................................ G06F 16/29
USPC ........................................................ 719/313
See application file for complete search history.

(56) References Cited

U.S. PATENT DOCUMENTS

| | | |
|---|---|---|
| 7,657,281 B2 | 2/2010 | Eibye |
| 9,170,863 B2 | 10/2015 | Varoglu et al. |

(Continued)

OTHER PUBLICATIONS

Selix, Jimmy, "Android: Setup Home and Work Locations for Google Now Traffic Cards," downloaded from the internet: https://www.tech-recipes.com/rx/27740/android-setup-your-home-and-work-locations-for-google-now-traffic-cards/, posted Jul. 1, 2012, 8 pgs.

*Primary Examiner* — Timothy A Mudrick
(74) *Attorney, Agent, or Firm* — Aikin & Gallant, LLP

(57) ABSTRACT

Methods, systems, and apparatus, including computer programs encoded on a computer storage medium, for retrieving local information on a user device include detecting itinerary information stored by a first application on a user device, and identifying a travel destination based on the detected itinerary information. The travel destination is communicated to a second application executable on a user device, and the travel destination is stored in association with the second application. The second application is adapted to retrieve local information based on an identified geographic location, and local information for the travel destination is provided through the second application in response to a user interaction with the second application and based on a triggering threshold associated with the itinerary information.

20 Claims, 8 Drawing Sheets

Related U.S. Application Data

Oct. 14, 2016, now Pat. No. 9,922,047, which is a continuation of application No. 14/922,551, filed on Oct. 26, 2015, now Pat. No. 9,471,599, which is a continuation of application No. 13/757,676, filed on Feb. 1, 2013, now Pat. No. 9,170,863.

(56) References Cited

U.S. PATENT DOCUMENTS

| | | |
|---|---|---|
| 9,471,599 B2 | 10/2016 | Varoglu et al. |
| 9,922,047 B2 | 3/2018 | Varoglu et al. |
| 2006/0235872 A1 | 10/2006 | Kline et al. |
| 2007/0130541 A1* | 6/2007 | Louch ................ G06F 3/04817 715/804 |
| 2008/0082930 A1* | 4/2008 | Omernick ......... H04M 1/72403 715/765 |
| 2008/0154655 A1 | 6/2008 | Hartmann et al. |
| 2009/0088965 A1 | 4/2009 | Burckart et al. |
| 2010/0153175 A1 | 6/2010 | Pearson et al. |
| 2011/0225257 A1 | 9/2011 | Tilden et al. |
| 2012/0011498 A1* | 1/2012 | Govindaraju ............. G06F 8/61 717/178 |
| 2012/0123667 A1 | 5/2012 | Guéziec |
| 2013/0117127 A1 | 5/2013 | Sosiak et al. |
| 2018/0300357 A1 | 10/2018 | Varoglu et al. |

* cited by examiner

DYNAMIC LOCATION SEARCH SUGGESTIONS BASED ON TRAVEL ITINERARIES

CROSS-REFERENCE TO RELATED APPLICATIONS

This application is a continuation of and claims priority to U.S. patent application Ser. No. 16/866,335, filed May 4, 2020, which is a continuation of U.S. patent application Ser. No. 16/371,975, filed Apr. 1, 2019, which is a continuation of U.S. patent application Ser. No. 15/925,363, filed Mar. 19, 2018, which is a continuation of U.S. application Ser. No. 15/293,644, filed on Oct. 14, 2016, now issued as U.S. Pat. No. 9,922,047 on Mar. 20, 2018, which is a continuation of U.S. application Ser. No. 14/922,551, filed Oct. 26, 2015, now issued as U.S. Pat. No. 9,471,599 on Oct. 18, 2016, which is a continuation of U.S. patent application Ser. No. 13/757,676, filed on Feb. 1, 2013, now issued as U.S. Pat. No. 9,170,863 on Oct. 27, 2015, the entire contents of each of which are incorporated herein by reference.

BACKGROUND

This specification relates to providing dynamic city search suggestions based on travel itineraries, including suggesting locations to search in one application based on travel plans identified in a different application.

Smart phones provide access to numerous sources of data and can run applications that organize and allow searching of information for specific topics. For example, weather applications may allow users to search for and/or select locations (e.g., cities) and to store the selected locations for use in retrieving information about local weather conditions, forecasts, radar, etc. The location data can be persisted in the application such that each time the application is opened, the local information can be updated for each of the stored locations. Other types of applications can perform similar operations to, for example, retrieve other types of local information for one or more selected locations each time an application is opened or activated from a background or hibernation state. In addition to allowing users to search for locations, some applications may allow the use of a current location, as detected through a global positioning satellite device or other positioning technique.

SUMMARY

In general, itinerary information received or detected on a user device in one application (e.g., a travel application) can be used to automatically and dynamically update persistent location data in one or more other applications (e.g., weather, clock, or dining applications). A destination location can be extracted from the itinerary information and provided to the one or more other applications, which can use the received application to automatically retrieve local information for the destination location. The timing of when the other applications retrieve the local information can be determined based on user preferences, defaults, travel dates, type of application, and/or other parameters. The other applications can execute on the same user device or on a different user device. For example, based on an itinerary stored in a travel application on a user device, destination information can be provided to a weather application and a clock application on the same user device, in addition to being provided to a weather application and a clock application on a friend's user device. The weather and clock applications can automatically search for weather and time information for the destination, although the timing of when such searches are performed can be delayed until closer to the travel date. Once the trip is complete, the destination can be removed from being persisted in the weather and clock applications, although the timing and performance of the removal can depend on user preferences, defaults, future travel information, type of application, and/or other parameters.

In one general aspect, a method of providing information in one application based on travel plans includes detecting itinerary information stored by a first application on a user device; identifying, by operation of a computing device, a travel destination based on the detected itinerary information; communicating the travel destination to a second application executable on a user device; storing the travel destination in association with the second application, wherein the second application is adapted to retrieve local information based on an identified geographic location; and providing local information for the travel destination through the second application in response to a user interaction with the second application and based on a triggering threshold associated with the itinerary information. Additional aspects can include corresponding apparatus, systems, and software including instructions for performing these actions.

Implementations can include one or more of the following features. The second application is adapted to automatically retrieve the local information for the travel destination. A user prompt to store the travel destination in association with the second application is presented, wherein the travel destination is stored in association with the second application in response to a user response to the user prompt. The second application includes a user interface adapted to allow a user to manually identify a geographic location and to retrieve local information based on the manually identified geographic location. The second application is stored on the user device. The first application executes on a first user device and the second application executes on a second user device, and communicating the travel destination to a second application includes communicating the travel destination from the first user device to the second user device. The first application communicates at least the travel destination through an application programming interface with an operating system of the user device. The first application communicates at least the travel destination through an application programming interface with the second application. The second application retrieves at least the travel destination through an application programming interface with an operating system of the user device. A time associated with the itinerary information is identified, and the local information based on an identified geographic location is retrieved or removed using the second application based at least in part on a triggering threshold associated with the identified time. A location of the user device is identified and the local information is retrieved or removed based at least in part on the location of the user device.

In another general aspect, a method includes detecting itinerary information, including a geographic location, stored by a first application on a user device; communicating data identifying the geographic location for use by a second application executable on the user device; storing the data identifying the geographic location in association with the second application, wherein the second application is adapted to retrieve local information based on the geographic location; and providing local information for the identified geographic location through the second application in response to a user activating the second application. Additional aspects can include corresponding apparatus, systems, and software including instructions for performing these actions.

Implementations can include one or more of the following features. Implementations can include one or more of the following features. A prompt for requesting authorization from a user to provide the local information for the identified geographic location through the second application is displayed. A prompt for requesting authorization from a user to store the data identifying the geographic location in association with the second application is displayed. The data identifying the geographic location stored in association with the second application is displayed based on a trigger threshold determined based at least in part on the itinerary information. Communicating the data identifying the geographic location for use by a second application executable on the user device is performed through an application programming interface associated with at least one of the first application or the second application.

In another general aspect, a system includes a first user device storing a first application operable, when executed by operation of a computer, to store itinerary information associated with a user of the first user device, wherein the first user device is adapted to execute the first application and to transmit at least a portion of the itinerary information to at least one target device; and a second user device storing a second application operable, when executed by operation of a computer, to retrieve local information based on itinerary information received from the first user device. Additional aspects can include corresponding apparatus, methods, and software including instructions for performing actions of the user devices.

Implementations can include one or more of the following features. The system includes a server, wherein the first user device is adapted to transmit the itinerary information to the server, and the server is adapted to forward the itinerary information to the at least one target device. The first device is adapted to transmit at least a portion of the itinerary information to at least one target device using an application programming interface with an operating system of the first device. The second device is adapted to provide the itinerary information to the second application using an application programming interface with an operating system of the second device.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

When people travel to new locations, they often desire to obtain information about the location. For example, two common topics of interest are the weather and the time at the destination location. Other topics may also be relevant, including local dining and transportation options, events and activities, or other local information. Travelers can search for such information through web browsing, for example, before leaving on a trip, and smart phones and other handheld or portable user devices can often be used to search for such information before and during travel. A user may access multiple applications or retrieve multiple web pages to obtain the information of interest. Unless the user has previously stored the location in an application that can provide local information for various locations, however, the user typically has to perform a search and/or otherwise manually add the destination location to the application. In accordance with techniques described in this specification, travel information entered and/or stored in one application on a user device can be leveraged to provide location suggestions or to automatically retrieve local information for a travel destination in one or more other applications. For example, local information for a travel destination can be retrieved in other applications on the user device without having to manually enter the location or search for the location. In addition, local information can be provided to applications on other user devices (e.g., devices of friends or relatives authorized to receive such information) so that other users also have access to local information where a friend or relative is visiting or otherwise currently located.

Figure 1:
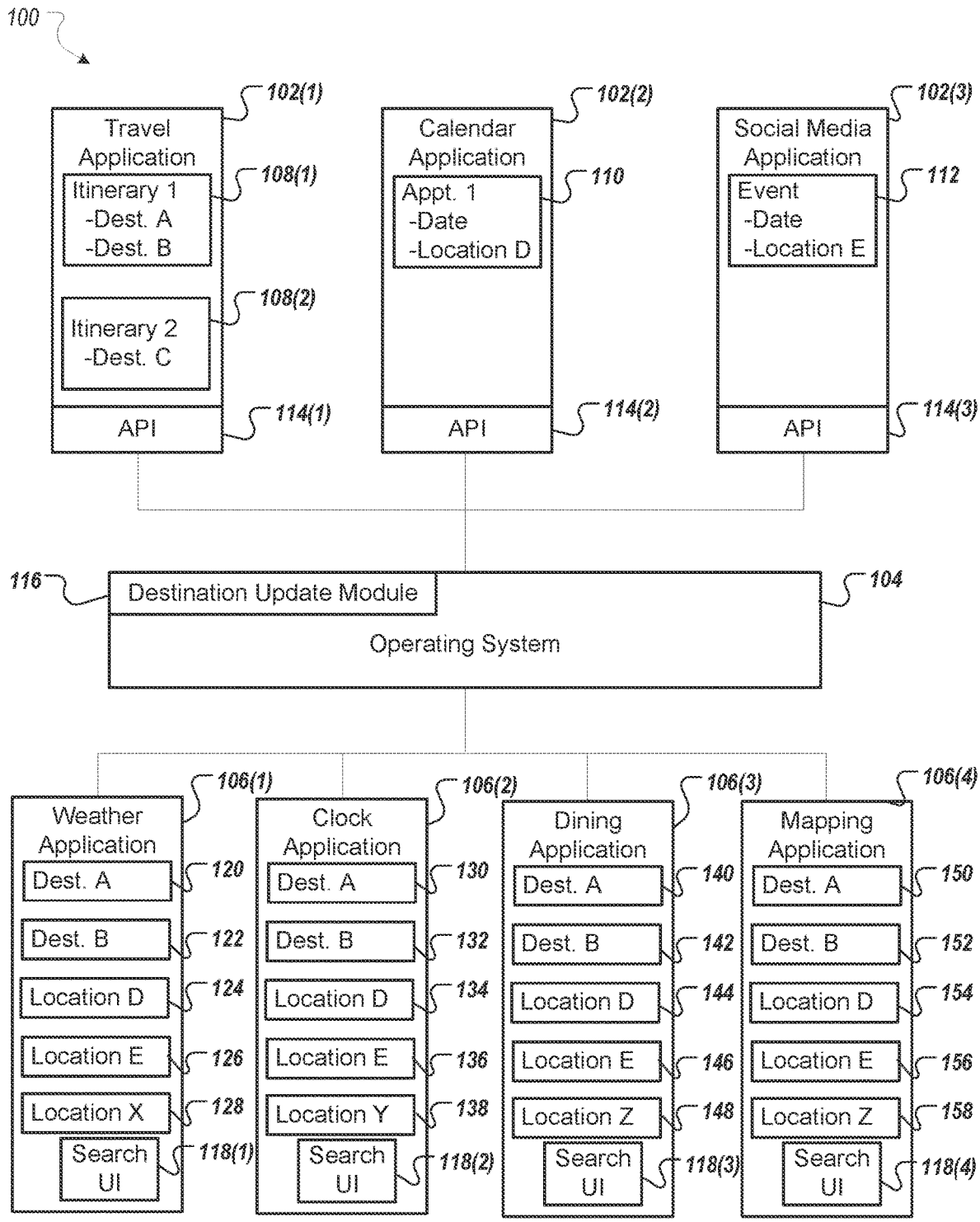
FIG. 1 depicts a schematic representation of a system for sharing destination information among different applications on a user device.

FIG. 1 depicts a schematic representation of a system 100 for sharing destination information among different applications on a user device. In general, the system 100 includes one or more source applications 102 that can be used to access or store itinerary information. For example, the source applications 102 can include a travel application 102(1) that may be used to create, store, or organize travel plans (e.g., flight numbers and schedules, hotel reservations, and rental car reservations), a calendar application 102(2) that can store future appointments or travel plans, and a social media application 102(3) that can store information about events (e.g., events for which the user has accepted an invitation). Other types of source applications 102 can also be used. In general, a source application can provide location information for some future event that may be of interest to the user. The source applications 102 execute on an operating system 104 that provides an execution environment, which can provide services and basic functionality.

One or more target applications 106 also execute on the operating system 104 and are programmed to retrieve and provide local information through a user interface of the user device. In particular, the target applications 106 can retrieve and provide local information for locations identified based on itinerary information stored in one or more of the source applications 102. The target applications 106, can include, for example, a weather application 106(1) that can retrieve current weather conditions and forecasts, a clock application 106(2) that can retrieve current local time at specific locations, a dining application 106(3) that can retrieve restaurant information and/or facilitate reservations, and a mapping application 106(4) that can retrieve local map information.

The travel application 102(1) can store itinerary information 108(1), 108(2) that identifies one or more destinations (e.g., Destinations A, B, and C). The itinerary information 108(1), 108(2) can also include travel dates and times. The itinerary information 108(1), 108(2) can be manually entered into the travel application 102(1) or automatically retrieved or stored by the travel application 102(1) in response to the user booking travel plans. For example, a user may purchase airline tickets through the travel application 102(1), which may store the airline itinerary information. Alternatively, the travel application 102(1) may be associated with a user account that has itinerary information stored in association with the account. The itinerary information 108(1), 108(2) can be automatically synchronized periodically with the user account. As another alternative, the travel application 102(1) may interface with other applications on a user device to receive the itinerary information 108(1), 108(2). The calendar application 102(2) may also be used to store appointments 110, which can include date and location information (e.g., location D). The social media application 102(3) can similarly store events 112, which can include data and location information (e.g., location E).

Each of the source applications 102 can include an application programming interface (API) 114 through which data (e.g., location, date, and time) from the source application 102 can be provided to the operating system 104 or to other applications, such as target applications 106. The API 114 can operate to automatically forward the data or to allow retrieval of the data in response to a request from the operating system 104 or a target application 106. In some implementations, the operating system 104 can include a destination update module 116 that can interface with the API 114 to receive data from the respective source application 102. The destination update module 116 can operate to store the data received from the source applications 102 for subsequent forwarding to or retrieval by the target applications 106. For example, the destination update module 116 can store the data until a target application 106 is activated (e.g., opened or taken out of an idle state), until the target application 106 requests the data, and/or until a predetermined triggering threshold (e.g., time, date, and/or user device location) occurs.

The target applications 106 generally include applications that are capable of retrieving local information. Typically, the target applications 106 can provide local information in response to user-specified search parameters entered through a corresponding search user interface (UI) 118(1), 118(2), 118(3), 118(4) for the respective target application 106. The target applications 106 can also provide local information for locations retrieved or otherwise provided by the source applications 102. For example, the weather application 106(1) can provide local weather conditions and forecasts for each of Destinations A and B 120, 122 and Locations D and E 124, 126 based on data received from the source applications 102. In addition, the weather application 106(1) can provide local weather conditions and forecasts for other locations (e.g., Location X 128) identified through search UI 118(1). The clock application 106(2) can provide local time for each of Destinations A and B 130, 132 and Locations D and E 134, 136 based on data received from the source applications 102. In addition, the clock application 106(2) can provide local time for other locations (e.g., Location Y 138) identified through search UI 118(2). Similarly, the dining application 106(3) can provide local dining options or other information, and the mapping application 106(4) can provide local maps, for each of Destinations A and B 140, 142, 150, 152 and Locations D and E 144, 146, 154, 156 based on data received from the source applications 102. In addition, the dining application 106(3) and the mapping application 106(4) can provide dining information and local maps for other locations (e.g., Location Z 148, 158) identified through a corresponding search UI 118(3), 118(4). Although not depicted in FIG. 1, each of the target applications 106 can include an API for interfacing with the source applications 102 and/or the operating system 104 and receiving data originating from the source applications 102.

In some implementations, the target applications 106 do not provide local information until some triggering threshold occurs. For example, the local information may not be provided until shortly before a trip is scheduled to begin. Different target applications can provide the local information beginning on different dates even for the same location. For example, the weather application 106(1) may begin displaying local weather conditions and forecasts for Destination A 120 a week before travel is scheduled, while the clock application 106(2) may begin displaying local time for Destination A 130 the day travel is scheduled. Triggering thresholds can also be used to determine when to remove or stop displaying local information. Triggering thresholds for adding and removing local data can depend on the dates and times associated with itinerary information, type of application, frequency of travel to the location, length of the trip, detected current location of the user device, and/or other criteria.

Figure 2:
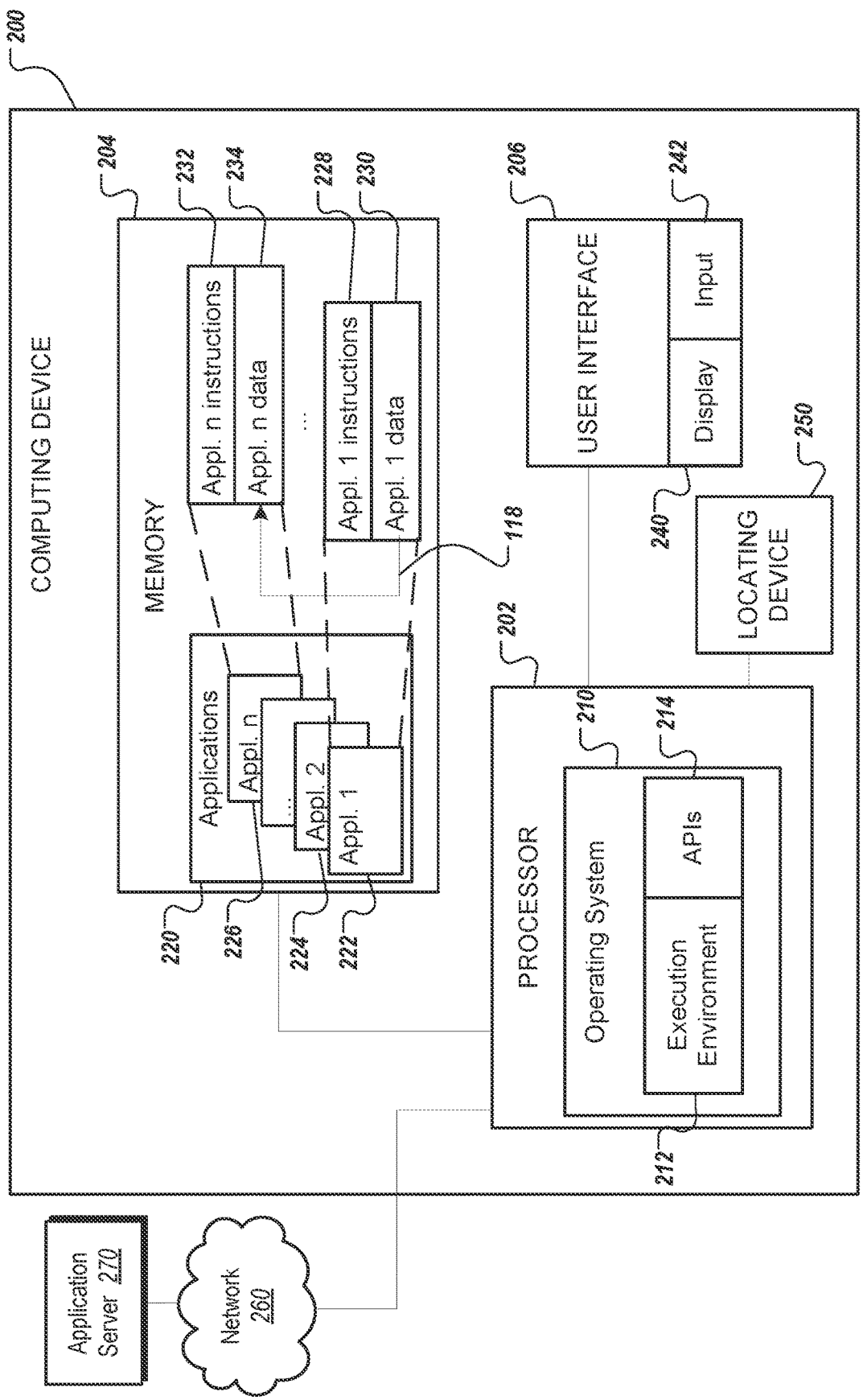
FIG. 2 is a block diagram of a computing device that can be used to implement the system of FIG. 1.

FIG. 2 is a block diagram of a computing device 200 that can be used to implement the system 100 of FIG. 1. The computing device 200 includes a processor 202, a memory 204, a user interface 206, and a locating device 208. Applications within an application set 220 stored in the memory 204 can execute in an execution environment 212 of operating system 210. The applications can interface with other applications in the application set 220 and/or with the operating system 210 through APIs 214 that may be included in the applications 220 and/or as part of the operating system 210. Any number of individual applications 222, 224, 226 can be stored in the memory 204 for execution. Each individual application 222, 224, 226 can includes application instructions 228, 232 and application data 230, 234. The application instructions 228, 232, when executed in the execution environment 212 provide the application functionality. For example, a first application 222 can include application instructions 228 that allow a user to define a travel itinerary, for example, directly through a user interface input 242 (e.g., manually typing in destination and travel date information) or through a reservation system capable of interacting with the first application 222 (e.g., the travel itinerary can be reserved through the first application or the travel itinerary can be synchronized with user account information stored on a remote server). The travel itinerary can be stored as a portion of the application data 230. The application instructions 228 can also include instructions that cause the application to forward or otherwise provide itinerary information, including information identifying travel destinations to the operating system or to other applications. For example, the application instructions 228 can include instructions that provide itinerary information through an API 214.

Another application 226 can include application instructions 232 that are used to provide access to weather information for selected locations. For example, the application instructions 232 can retrieve weather information for locations that a user has manually typed in or searched for through the user interface input 242. The application instructions 232 can also retrieve weather information for locations identified based on data (e.g., destination) received from the first application 222 (e.g., through APIs 214). The identified locations can be stored in the application data 234. The weather information for identified locations can be retrieved through a network 260 (e.g., Internet) from an application server 270 and provided to a user of the user device 200 through a user interface display 240. In some implementations, sharing of the location information can be based on user preferences or authorizations, which can be defined through the individual applications 222, 226 and/or through the operating system 210. In some cases, and as further discussed below, operations performed by the applications 222, 224, 226 can be based in part on a current location of the user device 200 as detected by a locating device 250 (e.g., a satellite-based or terrestrial-based locating system, such as GPS or cellular triangulation). Among other things, addition or removal of locations in the application data 234 can be based, at least in part, on the current location of the user device 200.

Figure 3:
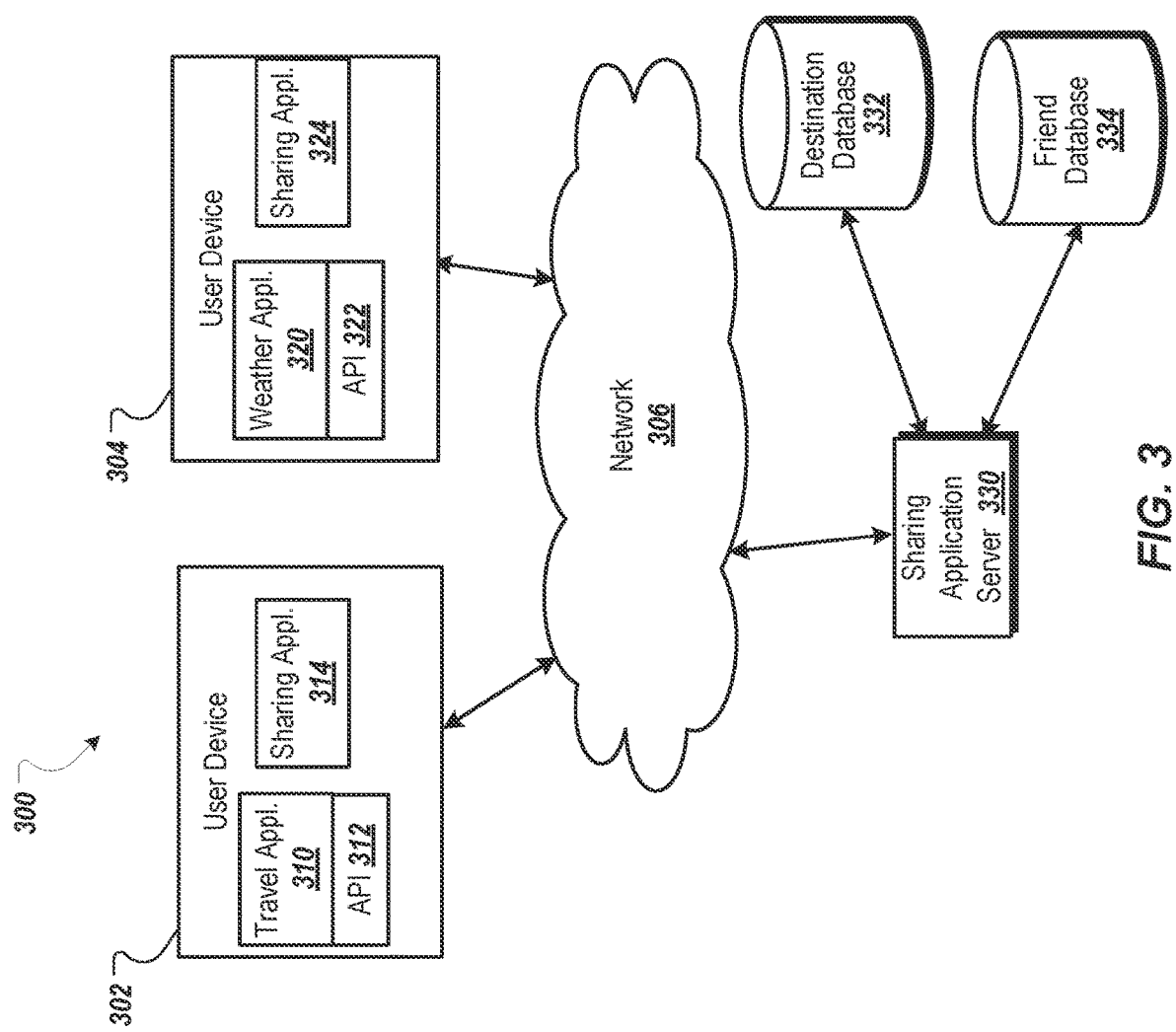
FIG. 3 is a schematic diagram of an example system for sharing destination information between applications on different user devices.

FIG. 3 is a schematic diagram of an example system 300 for sharing destination information between applications on different user devices 302, 304. Itinerary or travel destination information from a travel application 310 or other application on a first user device 302 can be shared with a weather application 320 or other application on a second user device 304. For example, a user of the second user device 304 can obtain local information for the location of a user of a first user device 302. Such a feature may allow a user to provide, for example, a spouse or close relative with information about the current weather conditions or current time where the user is traveling. To facilitate such sharing of information, the travel application 310 may include a built-in or add-on API 312 that forwards location information and/or other itinerary information to a weather application 320 on the second user device 304. The location information can be provided to the weather application 320 through an API 322. The weather application 320 can include instructions that cause the application to automatically retrieve weather information for the received location (or suggest the received location as a weather location of interest).

In some implementations, the travel application 310 may include a built-in or add-on API 312 that forwards itinerary information to, or allows retrieval of itinerary information by, a sharing application 314 on the user device 302. The sharing application 314 can be built into the operating system of the user device 302 or included as a separate application that executes on the user device. The sharing application 314 can interact with a corresponding sharing application 324 on the second user device 304 to share itinerary information. The sharing application 324 on the second user device 304 can provide the itinerary information received from the first user device 302 to the weather application 320 through the API 312. In some implementations, sharing of the itinerary information can be facilitated by a sharing application server 330, which can interface, for example, with sharing applications 314, 324, or directly with the travel application 310 and/or the weather application 320. For example, sharing application 314 or travel application 310 can forward itinerary information to sharing application server 330, which can store the itinerary information in a destination database 332.

The sharing application server 330 can, in addition or as an alternative, control whether information is shared between particular user devices (e.g., whether information from the user device 302 is shared with the second user device 304). Accordingly, the sharing application server 330 can determine whether the itinerary information is provided to the second user device 304 according to permissions, subscriptions, or other data stored in a friend database 334. For example, a user of the first user device 302 can define other users that are permitted to receive itinerary data from the travel application 310, the sharing application 314, and/or other applications on the user device 302. These permissions can be added manually, in response to a suggestion (e.g., a suggestion made by software based on frequent interactions with a user of the second user device 304), or automatically based on permissions granted in other applications or in the operating system of the first user device 302. Similarly, the user of the second user device 304 can subscribe to information from other users (e.g., the user of the first user device 302) manually, automatically, or in response to a suggestion. By subscribing to such information, the second user device 304 can automatically receive itinerary information from the first user device 302. The user of the second user device 304 can also subscribe to or receive individual events or itineraries. In some implementations, the described functions of the sharing application server 330, the destination database 332, and/or the friend database 334 can be built into software and the user devices 302, 304, e.g., in the sharing application 314, 324.

Although FIGS. 2 and 3 present specific examples of a travel application and a weather application, other types of applications can also be used. As with the different applications described above in connection with FIGS. 1 and 2, the different applications 310, 320 can be distinguished by the performance of different functions, operation on different inputs, and display of different user interfaces. For example, the respective application instructions can present different types of information to users, such that the applications are not merely different instances or versions of the same application.

Figure 4:
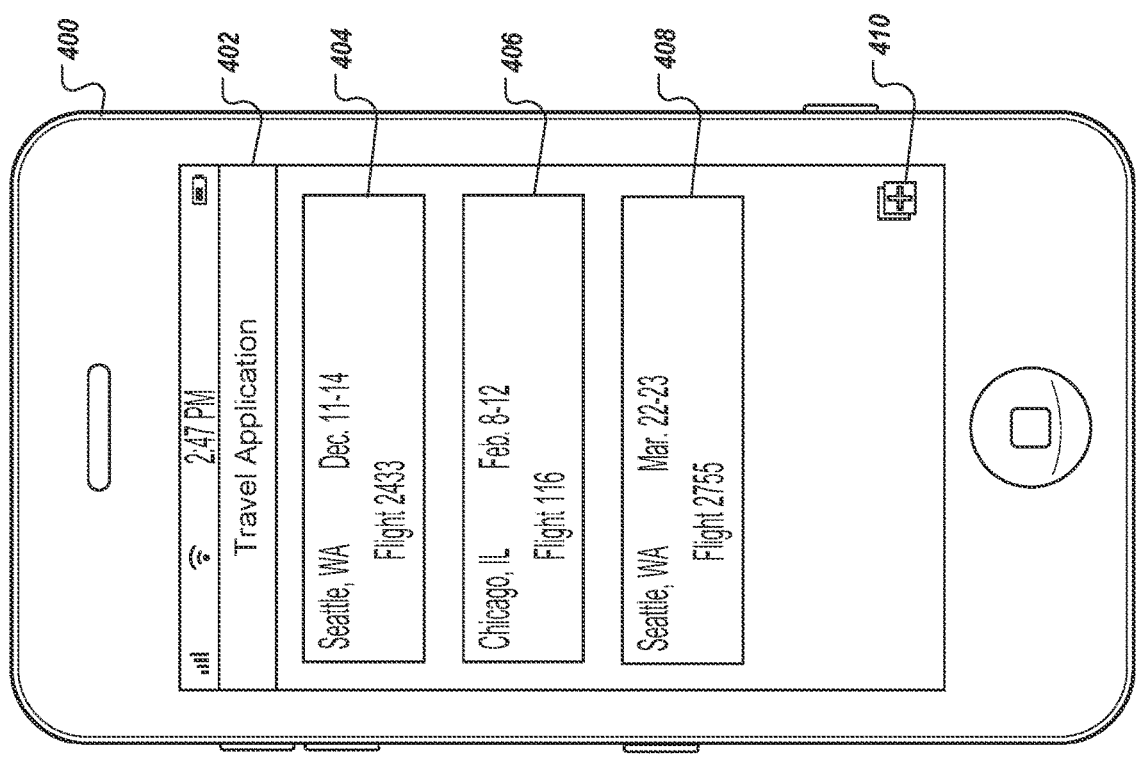
FIG. 4 depicts a mobile device displaying a travel application interface.

FIG. 4 depicts a mobile device 400 displaying a travel application interface 402. The travel application interface 402 includes itinerary information for three different trips, including a trip 404 to Seattle scheduled for December 11-14, a trip 406 to Chicago scheduled for February 8-12, and a trip 408 to Seattle scheduled for March 22-23. The travel application can also store additional information associated with each itinerary. In general, the itinerary information can be entered through appropriate interfaces in the travel application, can be received from a server (e.g., associated with the travel application or with one or more user travel-related accounts), or can be synchronized with travel information stored in other applications on the user device. In some implementations, the travel application can include information that is updated dynamically. For example, the travel application may store flight arrival and departure times that are updated automatically from a server when the flight times change and the travel application may be programmed to automatically update to reflect userinitiated travel changes such as date of travel by synchronizing with another application on the user device 400 or with changes stored on a remote server. The travel application interface 402 includes an icon 410 that allows a user to add new travel itineraries.

Figure 5:
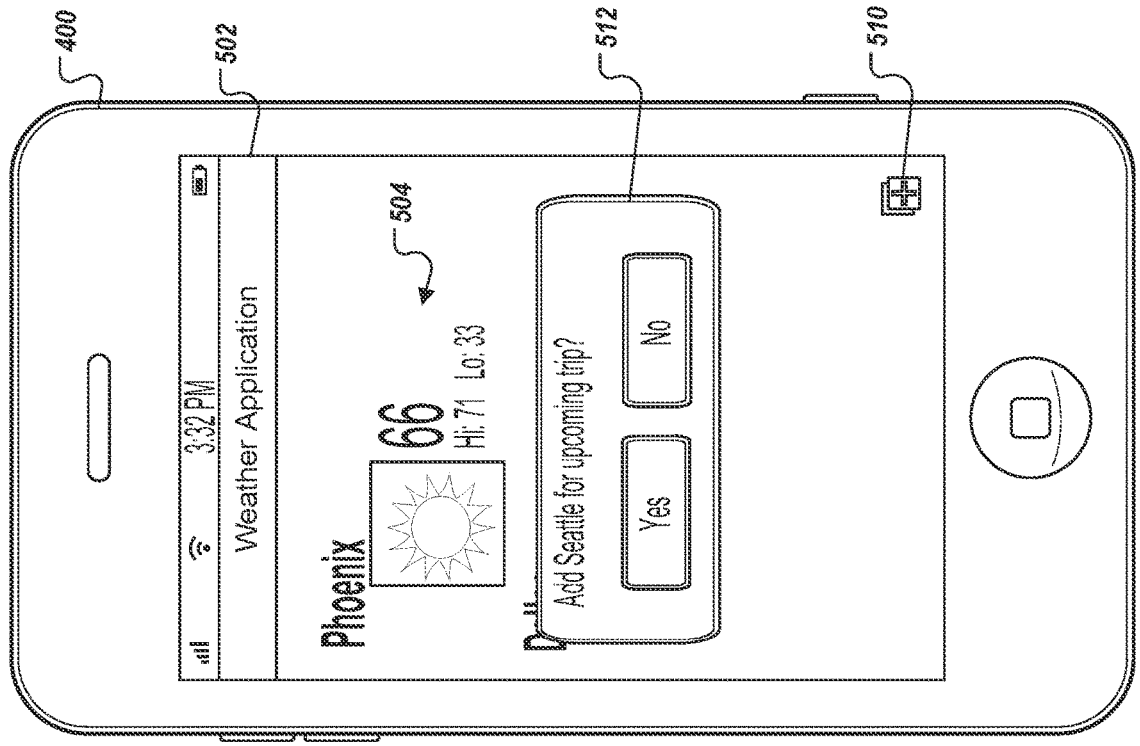
FIG. 5 depicts the mobile device of FIG. 4 displaying a weather application interface.

FIG. 5 depicts the mobile device 400 of FIG. 4 displaying a weather application interface 502. The weather application interface 502 can be displayed, for example, in response to a user closing (or exiting without closing) the travel application of FIG. 4 and opening a weather application. The weather application can provide the user with weather for one or more selected cities or other locations. As depicted in this example, the weather application interface 502 displays current weather and the current day's forecast information 504 for Phoenix. Other information can also or alternatively be presented, including, for example, other current condition information (e.g., wind speed and direction) or forecast information by the hour or for the next few days. In general, other cities or locations can be added to the weather application by selecting an icon 510 that can allow a user of the user device 400 to search for or manually select other locations. Based on information from the travel application of FIG. 4, however, the weather application can cause the weather application interface 502 to display a pop-up window 512 that suggests (and requests authorization to add) another location. In this example, the inclusion of a travel itinerary that includes Seattle in the travel application can cause the weather application interface 502 to display a pop-up window 512 that requests authorization to add Seattle as a location that is persisted in the memory associated with the weather application. The pop-up window 512 can be presented the next time the weather application is opened after Seattle is added as a travel destination, or at some later time (e.g., a few days before the trip to Seattle is scheduled to begin). As described above, the suggestion of Seattle within the weather application can be based on information communicated to the weather application through one or more APIs included in the travel application, the weather application, or the underlying operating system on which the applications execute.

Figure 6:
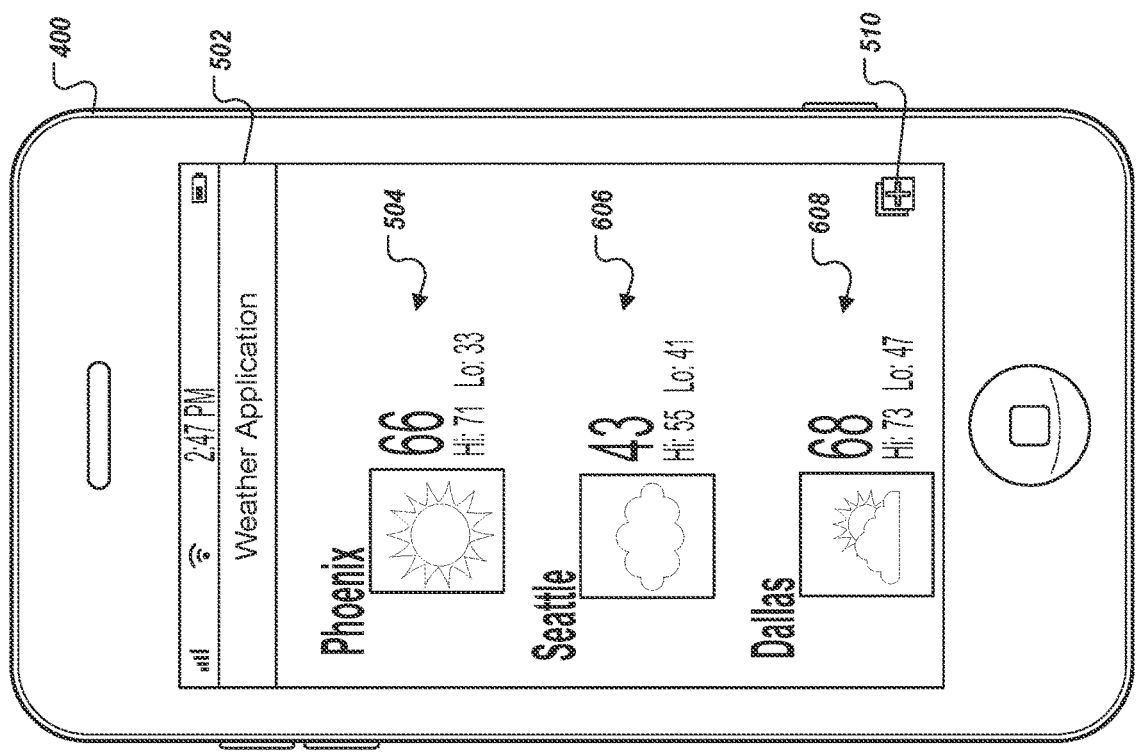
FIG. 6 depicts the mobile device of FIG. 4 displaying an updated view of the weather application interface.

FIG. 6 depicts the mobile device 400 of FIG. 4 displaying an updated view of the weather application interface 502. In the updated view, the weather application interface is updated to include weather conditions and forecast information 606 for Seattle in addition to weather conditions and forecast information 608 for Dallas. The Seattle information 606 can be added as a result of accepting the suggestion in the pop-up window 512 of FIG. 5 or automatically adding the information based on travel itinerary information from the travel application of FIG. 4.

Figure 7:
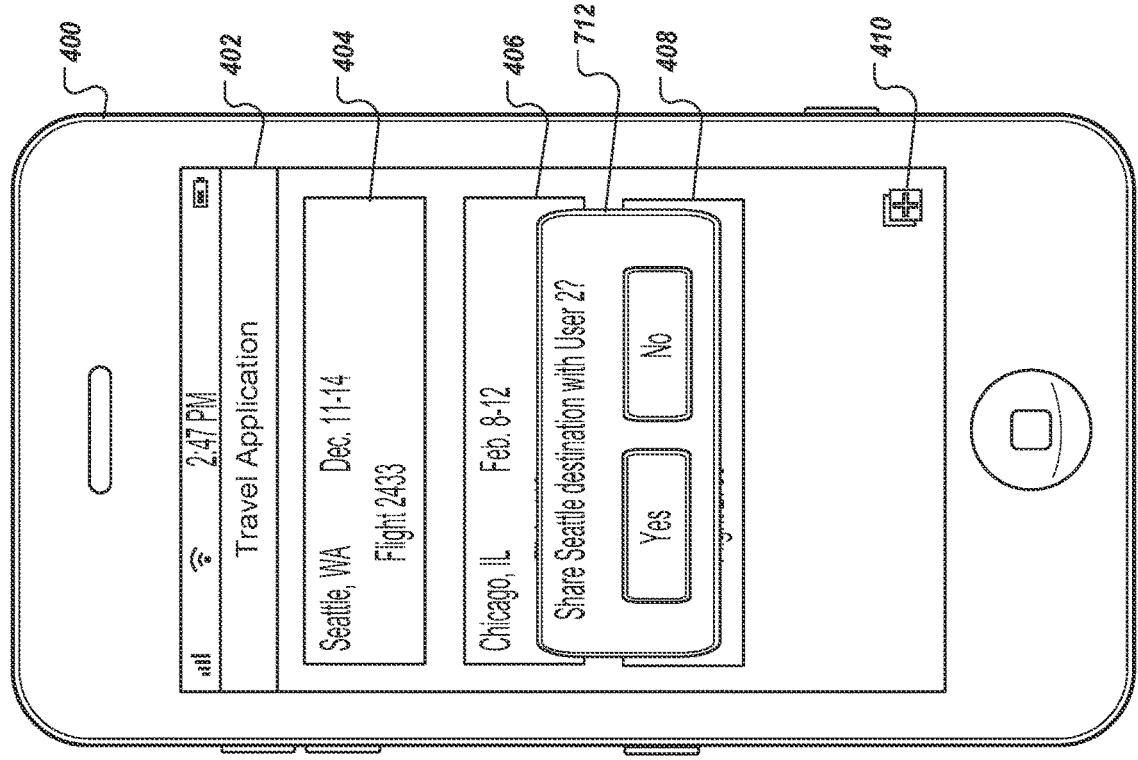
FIG. 7 depicts the mobile device of FIG. 4 displaying an invitation to share travel itinerary information with another user.

FIG. 7 depicts the mobile device 400 of FIG. 4 displaying an invitation to share travel itinerary information with another user. In particular, in response to adding itinerary information to the travel application (or in response to some other trigger), the travel application can cause the travel application interface 402 to display a pop-up window 712 that suggests (and requests authorization to) share information from the Seattle travel itinerary with a second user. For example, the information can be shared with a different application (e.g., a clock or weather application) on a user device of the second user. The second user can be suggested based on stored "friend" information, based on prior (e.g., frequent) interactions with the second user, or other criteria.

Figure 8:
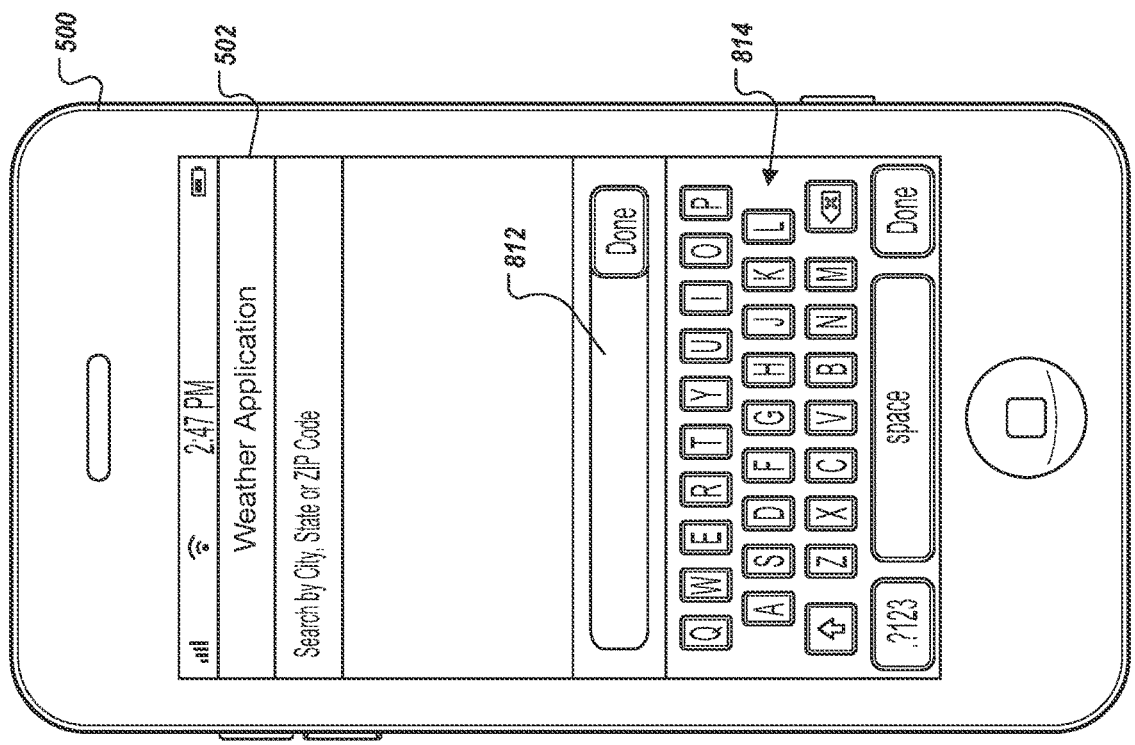
FIG. 8 depicts the mobile device of FIG. 4 displaying an alternative user interface of the weather application interface.

FIG. 8 depicts the mobile device 400 of FIG. 4 displaying an alternative user interface of the weather application interface 502. In particular, in response to a user selection of the icon 510 of FIG. 5, the weather application interface 502 can be updated to include an interface for manually searching for locations by typing search parameters into a search field 812 using a character key 814. Other techniques for manually identifying locations to add to an application can also be used (e.g., selecting from a list).

Figure 9:
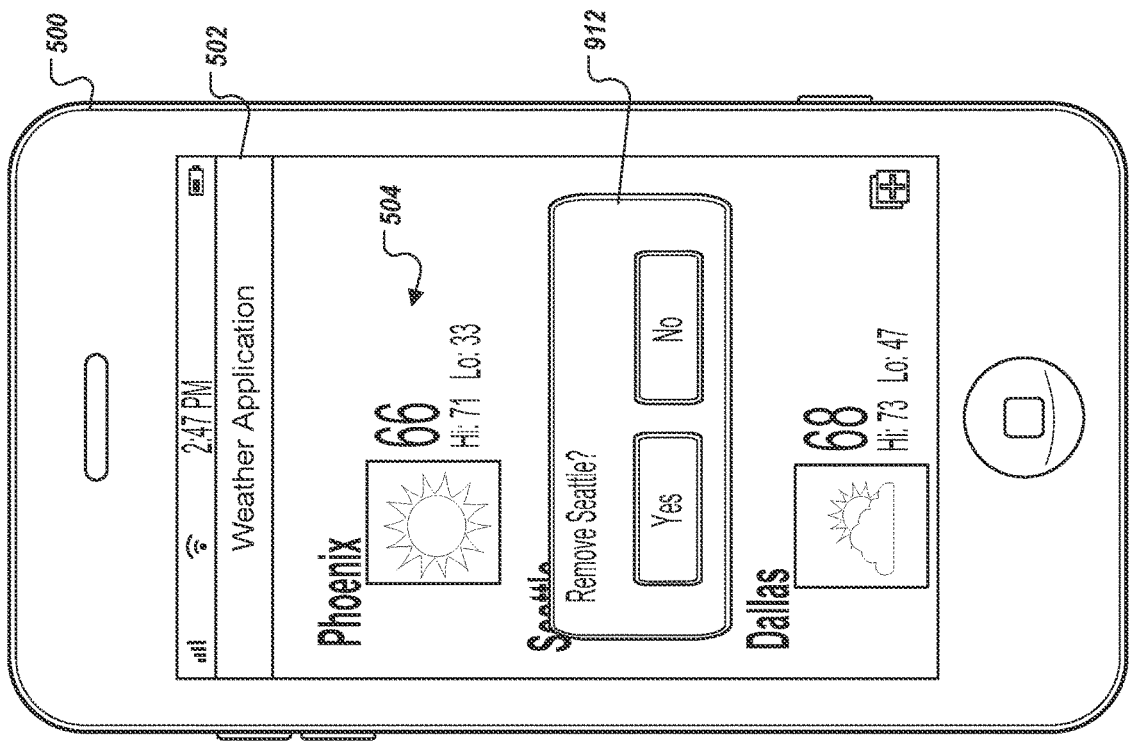
FIG. 9 depicts the mobile device of FIG. 4 displaying an alternative user interface of the weather application interface.

FIG. 9 depicts the mobile device 400 of FIG. 4 displaying an alternative user interface of the weather application interface 502. Based on information from the travel application of FIG. 4, for example, the weather application can cause the weather application interface 502 to display a pop-up window 912 that requests instructions on whether to remove a location from the location list associated with the application. For example, the pop-up window 912 can be displayed as a result of detecting that end date and/or time of a travel itinerary has occurred. Alternatively, in some implementations, a location can be automatically removed without requesting confirmation from a user. In addition, in some situations, a location may be automatically retained as a result of determining that the location is a frequent destination. Although the example of a weather application is used throughout FIGS. 4-9, other types of applications that retrieve information based on location can be used.

Figure 10:
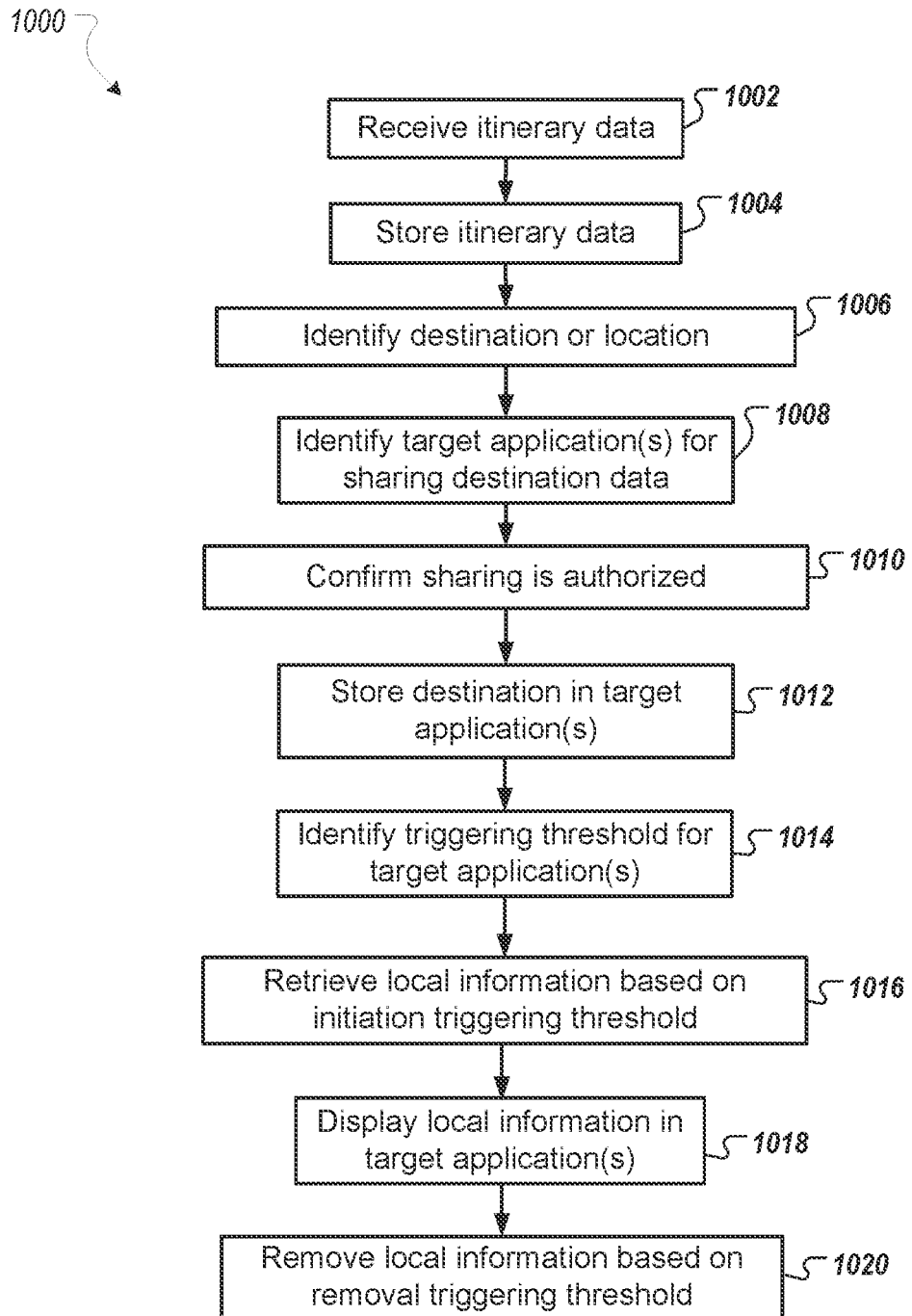
FIG. 10 is a flow diagram of a process for automatically providing local information in one application based on itinerary information in another application.

FIG. 10 is a flow diagram of a process 1000 for automatically providing local information in one application based on itinerary information in another application. Itinerary information is received on a user device (at 1002). The information can be received through a travel reservation made through the user device or through a user account that synchronizes with the user device or the information can be manually added by a user. The received itinerary information is stored by a first application on the user device (at 1004). The first application include, for example, a calendar, an application that stores travel or event information received from a server or another application on the same user device, a social media application, or a mapping application. A travel destination is identified based on the detected itinerary information (at 1006). One or more target applications for sharing the destination data are identified (at 1008). The target applications can be identified based on parameters or user preferences associated with the first application or with the operating system of the user device. The target applications can be stored on the user device or can be associated with a different user device. A confirmation that sharing is authorized can be made (at 1010). For example, the first application, the operating system associated with the user device or another user device, a server that stores authorization information, and/or the second application can determine whether a user has authorized sharing of the information with the second application.

The travel destination is communicated to the second application and stored in association with the second application (at 1012). In some cases, the travel destination can be stored for some period in an intermediate location (e.g., by the user device operating system). A triggering threshold is identified for retrieving local information for the travel destination using the second application (at 1014). An initiation triggering threshold can be based, for example, on a travel date and/or may be dependent upon when and how often a user opens the application. Moreover, the triggering threshold can be determined by the second application, by an operating system that provides the travel destination to the second application, or by a server that stores the travel destination during some interim period. The triggering threshold can also include parameters defining when and if the travel destination and/or the local information should be removed from the second application. Based on the initiation triggering threshold, the second application retrieves local information for the identified travel destination (at 1016), and the local information for the travel destination is provided through the second application (at 1018). For example, the local information can be displayed in response to a user interaction with the second application (e.g., opening the application and/or accepting a suggestion to retrieve the local information for the travel destination). The local information (or the travel destination) is removed from the second application (or from being associated with the second application) based on a removal triggering threshold (at 1020). For example, the removal triggering threshold can be associated with timing of the end of a trip or other event.

Figure 11:
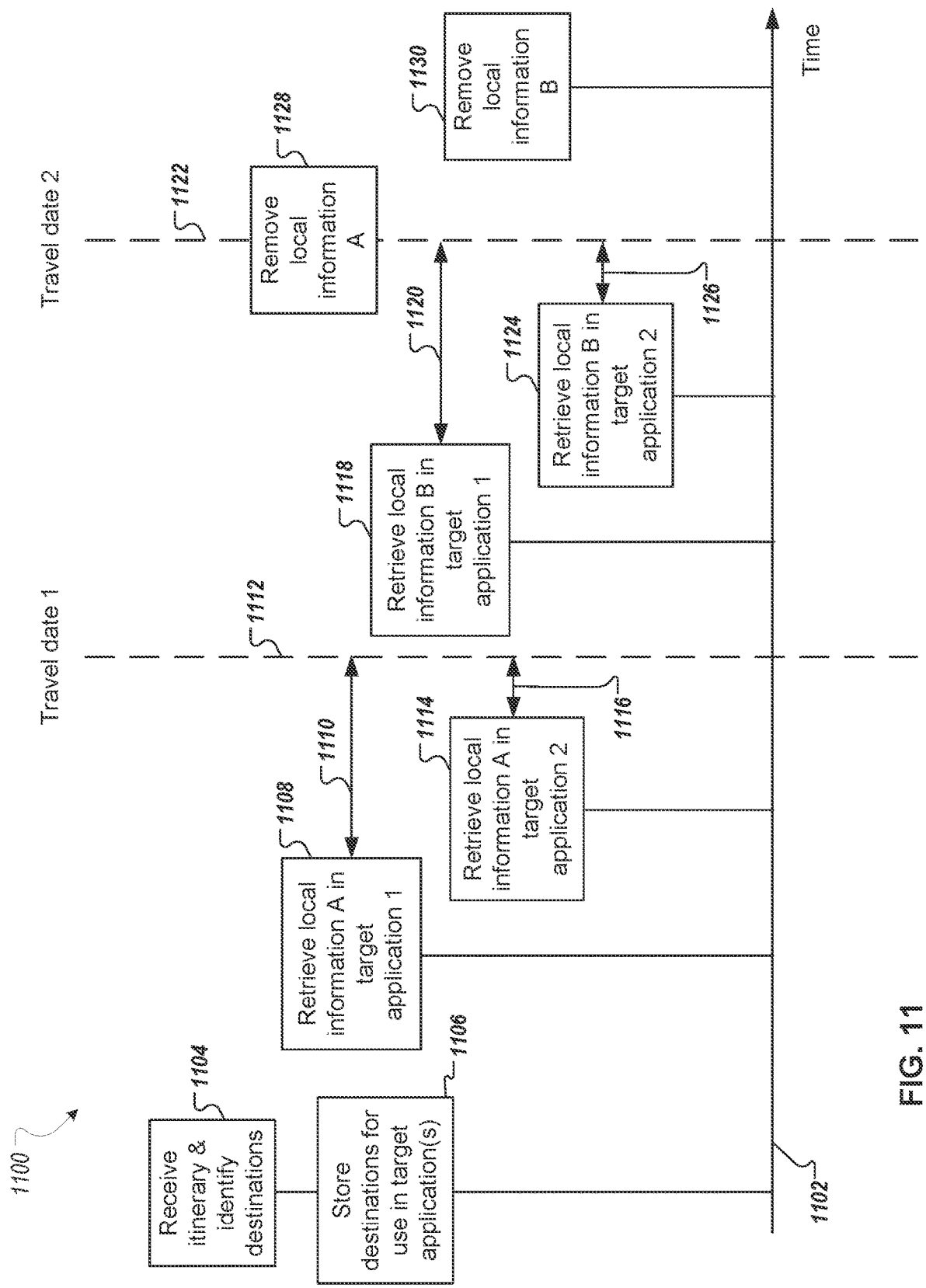
FIG. 11 is a representative timeline diagram of a process for automatically providing local information in an application-based information from another application.

FIG. 11 is a representative timeline diagram of a process 1100 for automatically providing local information in an application-based information from another application. The process 1100 occurs along a timeline 1102. A travel itinerary is received and one or more destinations are identified (at 1104). The destinations are stored for use in one or more target applications (at 1106). For example, the destinations can be stored in the target applications or for later delivery to the target applications in accordance with triggering information. Local information (e.g., weather or dining options) for a first destination A is retrieved in a first target application (at 1108). The retrieval of the local information for destination A in the first target application can be triggered a predetermined period of time 1110 prior to a date of travel 1112 to destination A. For example, retrieval of weather information may be triggered four or five days before the travel date 1112. Local information (e.g., time) for the first destination A is retrieved in a second target application (at 1114). The retrieval of the local information for destination A in the second target application can be triggered a predetermined period of time 1116 prior to a date of travel 1112 to destination A. For example, retrieval of time information may be triggered one day before the travel date 1112. Thus, triggers (including both initiation or retrieval triggers and removal or deletion triggers) can be different for different target applications. In some implementations, the triggers can be determined based on default or user-defined triggering parameters and can also include receiving a user confirmation that a destination should be added or removed. The triggers can also define when the destination information is provided to the target application and/or when the target application begins retrieving local information for the destination. In some implementations, the triggers can be based on other information besides time, including location of the user device (e.g., arrival at the airport for outgoing or return travel) or other information.

If the itinerary includes multiple destinations, local information for a second destination B is retrieved in the first target application (at 1118) a predetermined period of time 1120 prior to a date of travel 1122 to destination B, and local information for the second destination B is retrieved in the second target application (at 1124) a predetermined period of time 1126 prior to the date of travel 1122 to destination B. Local information in the target applications for the first destination A can be deleted and/or the persistence of the destination in memory can be removed from the target applications (at 1128) when travel to the second destination begins or is scheduled to begin or based on some other removal trigger. Similarly, local information in the target applications for the second destination B can be deleted and/or the persistence of the destination in memory can be removed from the target applications (at 1130) when a stay at the second destination B is complete.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a physical or virtual keyboard and pointing device, e.g., a mouse, a trackball, or a touch screen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory machine readable medium storing instructions executable by an electronic device to perform operations comprising:
 identifying, by the electronic device, a travel destination based on information for a calendar application;
 communicating the travel destination to a second application on the electronic device associated with a first user account, Wherein the second application is adapted to retrieve information associated with an identified geographic location;
 identifying a time of travel to the travel destination based on the information stored by the first application;
 presenting, on the electronic device, a suggestion to retrieve information related to the identified geographic location; and retrieving the information associated with the identified geographic location in response to a request for the suggestion.

2. The non-transitory machine readable medium of claim 1, wherein the second application is a clock application, a mapping application, a dining application, a travel application, a social media application, a sharing application, or a weather application.

3. The non-transitory machine readable medium of claim 1, wherein the travel destination is synchronized between devices associated with the user account.

4. The non-transitory machine readable medium of claim 1, the operations further comprising:
providing, through the second application, information associated with the travel destination, the information associated with the travel destination provided based on the time of travel to the travel destination application.

5. The non-transitory machine readable medium of claim 1, the operations further comprising:
presenting, on the electronic device, a suggestion to retrieve and information related to the identified geographic location to a second user account; and
in response to receiving authorization to share information, sending information related to the identified geographic location to a second electronic device associated with the second user account.

6. The non-transitory machine readable medium of claim 1, the operations further comprising:
identifying, by the electronic device, a travel destination based on information for a calendar application associated with a second user account;
communicating the travel destination to a third application on a second electronic device associated with a second user account wherein the third application is adapted to retrieve information associated with an identified geographic location; and
presenting, on the second electronic device, a suggestion to retrieve information related to the identified geographic location.

7. The non-transitory machine readable medium of claim 1, the operations further comprising:
presenting, on the electronic device, a suggestion to retrieve information related to the identified geographic location in response to a triggering threshold associated with a location of the electronic device or a local time associated with the electronic device.

8. A method comprising:
identifying, by the electronic device, a travel destination based on information for a calendar application;
communicating the travel destination to a second application on the electronic device associated with a first user account, wherein the second application is adapted to retrieve information associated with an identified geographic location;
identifying a time of travel to the travel destination based on the information stored by the first application;
presenting, on the electronic device, a suggestion to retrieve information related to the identified geographic location; and
retrieving the information associated with the identified geographic location in response to a request for the suggestion.

9. The method of claim 8, wherein the second application is a clock application, a mapping application, a dining application, a travel application, a social media application, a sharing application, or a weather application.

10. The method of claim 8, wherein the travel destination is synchronized between devices associated with the user account.

11. The method of claim 8, further comprising:
providing, through the second application, information associated with the travel destination, the information associated with the travel destination provided based on the time of travel to the travel destination application.

12. The method of claim 8, further comprising:
presenting, on the electronic device, a suggestion to retrieve and information related to the identified geographic location to a second user account; and
in response to receiving authorization to share information, sending information related to the identified geographic location to a second electronic device associated with the second user account.

13. The method of claim 8, the operations further comprising:
identifying, by the electronic device, a travel destination based on information for a calendar application associated with a second user account;
communicating the travel destination to a third application on a second electronic device associated with a second user account, wherein the third application is adapted to retrieve information associated with an identified geographic location; and
presenting, on the second electronic device, a suggestion to retrieve information related to the identified geographic location.

14. The method of claim 8, further comprising:
presenting, on the electronic device, a suggestion to retrieve information related to the identified geographic location in response to a triggering threshold associated with a location of the electronic device or a local time associated with the electronic device.

15. A data processing system on an electronic device, the data processing system comprising:
a non-transitory machine-readable medium storing instructions;
one or more processors to execute the instructions, the instructions to cause the one or more processors to perform operations comprising:
identifying, by the electronic device, a travel destination based on information for a calendar application;
communicating the travel destination to a second application on the electronic device associated with a first user account, wherein the second application is adapted to retrieve information associated with an identified geographic location;
identifying a time of travel to the travel destination based on the information stored by the first application;
presenting, on the electronic device, a suggestion to retrieve information related to the identified geographic location; and
retrieving the information associated with the identified geographic location in response to a request for the suggestion.

16. The data processing system of claim 15, wherein the second application is a clock application, a mapping application, a dining application, a travel application, a social media application, a sharing application, or a weather application.

17. The data processing system of claim 15, wherein the travel destination is synchronized between devices associated with the user account.

18. The data processing system of claim 15, the operations further comprising:
    providing, through the second application, information associated with the travel destination, the information associated with the travel destination provided based on the time of travel to the travel destination application.

19. The data processing system of claim 15, the operations further comprising:
    presenting, on the electronic device, a suggestion to retrieve and information related to the identified geographic location to a second user account; and
    in response to receiving authorization to share information, sending information related to the identified geographic location to a second electronic device associated with the second user account.

20. The data processing system of claim 15, the operations further comprising:
    identifying, by the electronic device, a travel destination based on information for a calendar application associated with a second user account;
    communicating the travel destination to a third application on a second electronic device associated with a second user account, wherein the third application is adapted to retrieve information associated with an identified geographic location; and
    presenting, on the second electronic device, a suggestion to retrieve information related to the identified geographic location.

* * * * *